(12) United States Patent
Heer

(10) Patent No.: US 6,341,328 B1
(45) Date of Patent: Jan. 22, 2002

(54) METHOD AND APPARATUS FOR USING MULTIPLE CO-DEPENDENT DMA CONTROLLERS TO PROVIDE A SINGLE SET OF READ AND WRITE COMMANDS

(75) Inventor: Daniel Nelson Heer, Newton, NH (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/295,010

(22) Filed: Apr. 20, 1999

(51) Int. Cl.[7] .............................................. G06F 12/00
(52) U.S. Cl. ......................... 711/112; 711/154; 714/11; 712/247; 710/101
(58) Field of Search ................................ 711/112, 150, 711/162, 168, 154, 100; 714/6, 11; 712/247; 710/20, 21, 22, 100, 101

(56) References Cited

U.S. PATENT DOCUMENTS

| | | | | |
|---|---|---|---|---|
| 5,212,795 A | * | 5/1993 | Hendry | |
| 5,495,570 A | * | 2/1996 | Heugel et al. | ................. 714/11 |
| 5,535,414 A | * | 7/1996 | Burge | ............................. 710/7 |
| 5,724,501 A | * | 3/1998 | Dewey et al. | ................. 714/9 |
| 5,875,312 A | * | 2/1999 | Walsh et al. | ................. 395/309 |
| 5,887,270 A | * | 3/1999 | Brant et al. | ................... 711/162 |
| 5,987,621 A | * | 11/1999 | Duso et al. | ..................... 714/4 |
| 6,145,027 A | * | 11/2000 | Seshan et al. | ................. 710/22 |
| 6,148,414 A | * | 11/2000 | Brown et al. | ................... 714/9 |
| 6,209,042 B1 | * | 3/2001 | Yanagisawa et al. | .......... 710/3 |

* cited by examiner

Primary Examiner—Matthew Kim
Assistant Examiner—Pierre-Michel Bataille
(74) Attorney, Agent, or Firm—John E. Curtin, Esq.; Troutman Sanders LLP

(57) ABSTRACT

A microcomputer incorporates a pair of DMA controllers that are co-dependently operated to read and write common data blocks to two peripheral devices. In an exemplary embodiment of the invention, one of the DMA controllers is designated to read a data block from memory, store the data, and then write the data in a single write cycle to each of the two peripheral devices. This DMA controller provides the address and control signals necessary for writing the data to a first of the two peripheral devices, while the other DMA controller provides the address and control signals necessary for writing the data block to a second of the two peripheral devices. As a result, only one read and one write command are required for the data to be written to the two peripheral devices.

9 Claims, 10 Drawing Sheets

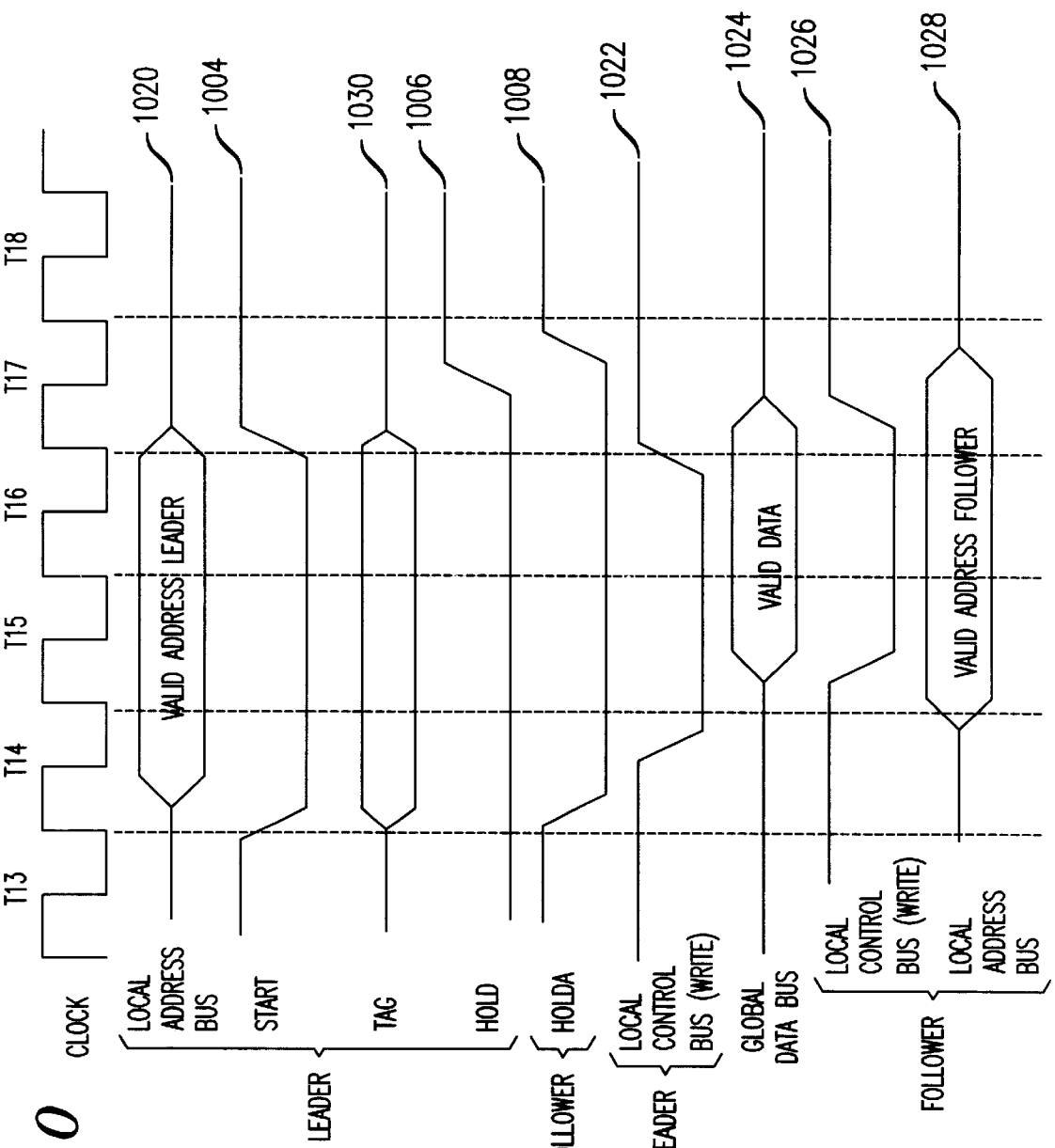

METHOD AND APPARATUS FOR USING MULTIPLE CO-DEPENDENT DMA CONTROLLERS TO PROVIDE A SINGLE SET OF READ AND WRITE COMMANDS

TECHNICAL FIELD

This invention relates to microcomputers, and more particularly, to microprocessors and digital signal processors that use multiple DMA controllers.

BACKGROUND OF THE INVENTION

Direct Memory Access (DMA) controllers are well-known devices used, for example, to transfer data between a microcomputer's primary memory and associated peripheral devices (see, e.g., Michael Slater, *Microprocessor-Based Design,* Prentice-Hall, 1989, pp. 273–280). These devices are often used to support data transfer from primary memory to peripheral devices requiring high data transfer rates (for example, graphics display terminals, digital to analog converters and disk drives). In managing data transfer between a microcomputer processing unit's primary memory and such devices, DMA controllers can often allow higher rates of data transfer (higher bandwidth) than would be achieved by the processing unit in such transfers, and increase the time available to the processing unit to support other tasks.

Microcomputer applications for DMA controllers are increasing in number. For example, an increasing number of functions formerly performed by integrated circuit general processing units executing stored program instructions are currently being implemented as distinct, dedicated hardware devices or device elements. To minimize interaction between the general processing units and these dedicated hardware elements, DMA controllers are typically used to move data between the hardware elements and the primary memory.

In support of some microcomputer operations, a common set of data may be processed by more than one hardware element. One example of this can be found in systems supporting Internet Packet Security (IPSEC). IPSEC systems incorporate, for example, two dedicated hardware elements: 1) hash message authentication code (HMAC) and 2) encryption/decryption. The order in which these two elements are invoked depends on the security regime defined by the data packet that is being processed. For example, a first packet may require decryption followed by HMAC, while a second packet may require HMAC followed by decryption. Because each element requires an original copy of each data packet, each packet must be transferred to each of the two hardware elements.

To support data transfer to multiple hardware elements, current microcomputers often incorporate multiple DMA controllers, each independently supporting one associated hardware element. While these individual controllers provide high data transfer rates for their hardware elements, in the course of operation they will each independently read and write common data. As a result, system throughput may be adversely impacted when a large volume of common data is being transferred to these hardware elements.

SUMMARY OF THE INVENTION

Throughput is substantially improved in a microcomputer system employing multiple, co-dependent DMA controllers to manage data transfers associated with dedicated hardware functions. Each system includes a main processing unit, a memory, at least two DMA controllers, and at least two peripheral devices implementing dedicated hardware functions. Each of these elements is interconnected via a global data bus. In addition, the main processing unit, the memory and the DMA controllers are interconnected via a global control bus and a global address bus. Further, each DMA controller is interconnected to an associated peripheral device via a local address bus and a local control bus, and is able to communicate with the other DMA controllers through a DMA communications bus.

An exemplary embodiment of the invention includes two co-dependent DMA controllers each interconnected to a peripheral device. Each DMA controller provides the signals over its local control bus and local address bus for data to be written to its associated peripheral device. However, only one DMA controller is designated to read data from memory and then write this data to each of the peripheral devices. In this manner, the separate read and write commands executed by DMA controllers in prior art systems to transfer common data to multiple peripheral devices are reduced to a single set of read and write commands by a DMA controller "leader", thereby reducing bus resources required for such data transfers.

BRIEF DESCRIPTION OF THE DRAWING

The invention will be more fully understood from the following detailed description taken in connection with the accompanying drawing, in which:

FIGS. 9, 10 provide a second alternative to the timing diagram of FIG. 7, applicable to a second alternative embodiment of the invention, in which a tag signal is used by the leader to signal to the follower that it is ready to transfer a first data element to the peripheral device associated with the follower.

Figure 1:
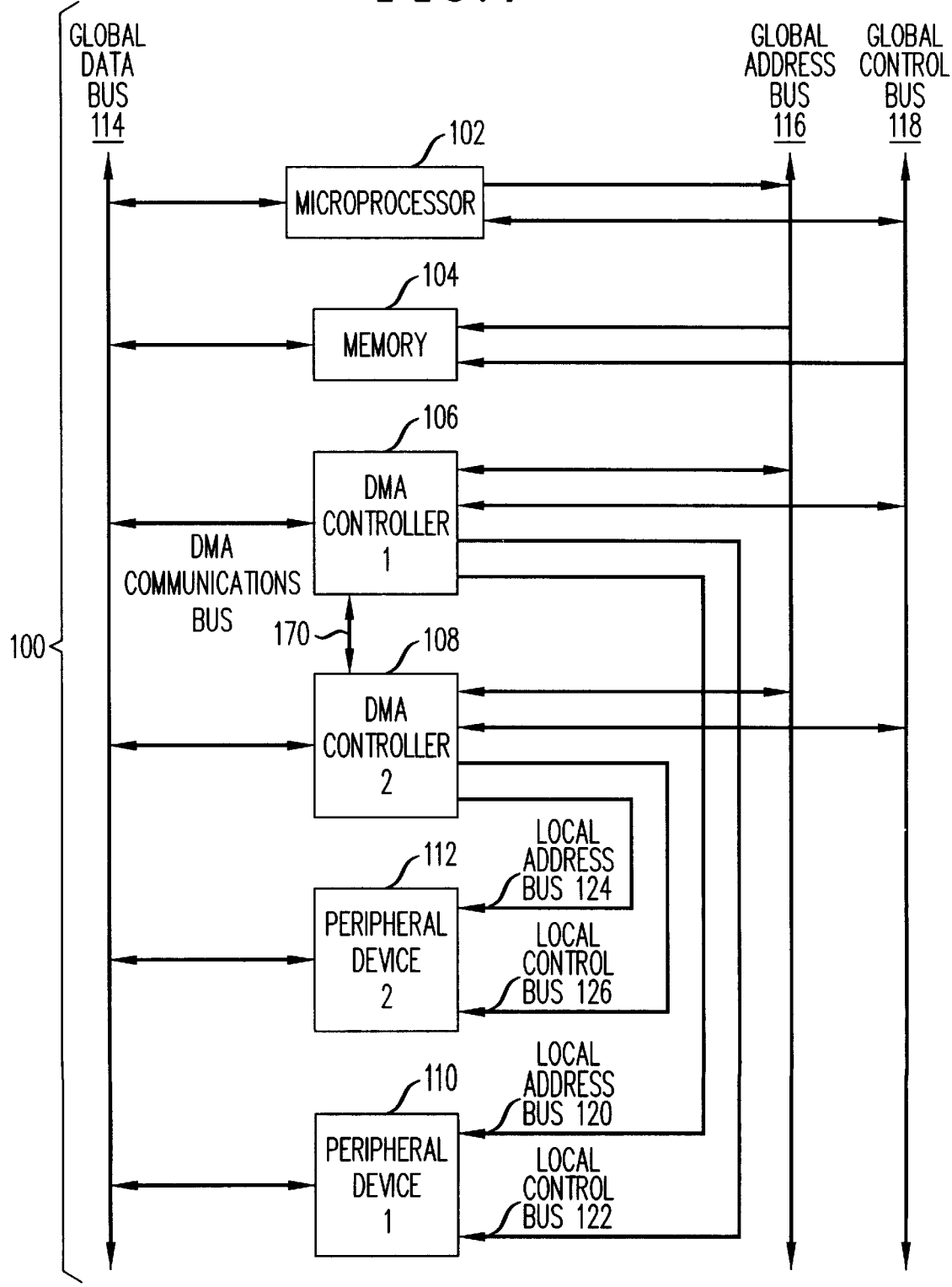
FIG. 1 illustrates an embodiment of the invention, in which a microcomputer incorporates two co-dependent DMA controllers.
Figure 2:
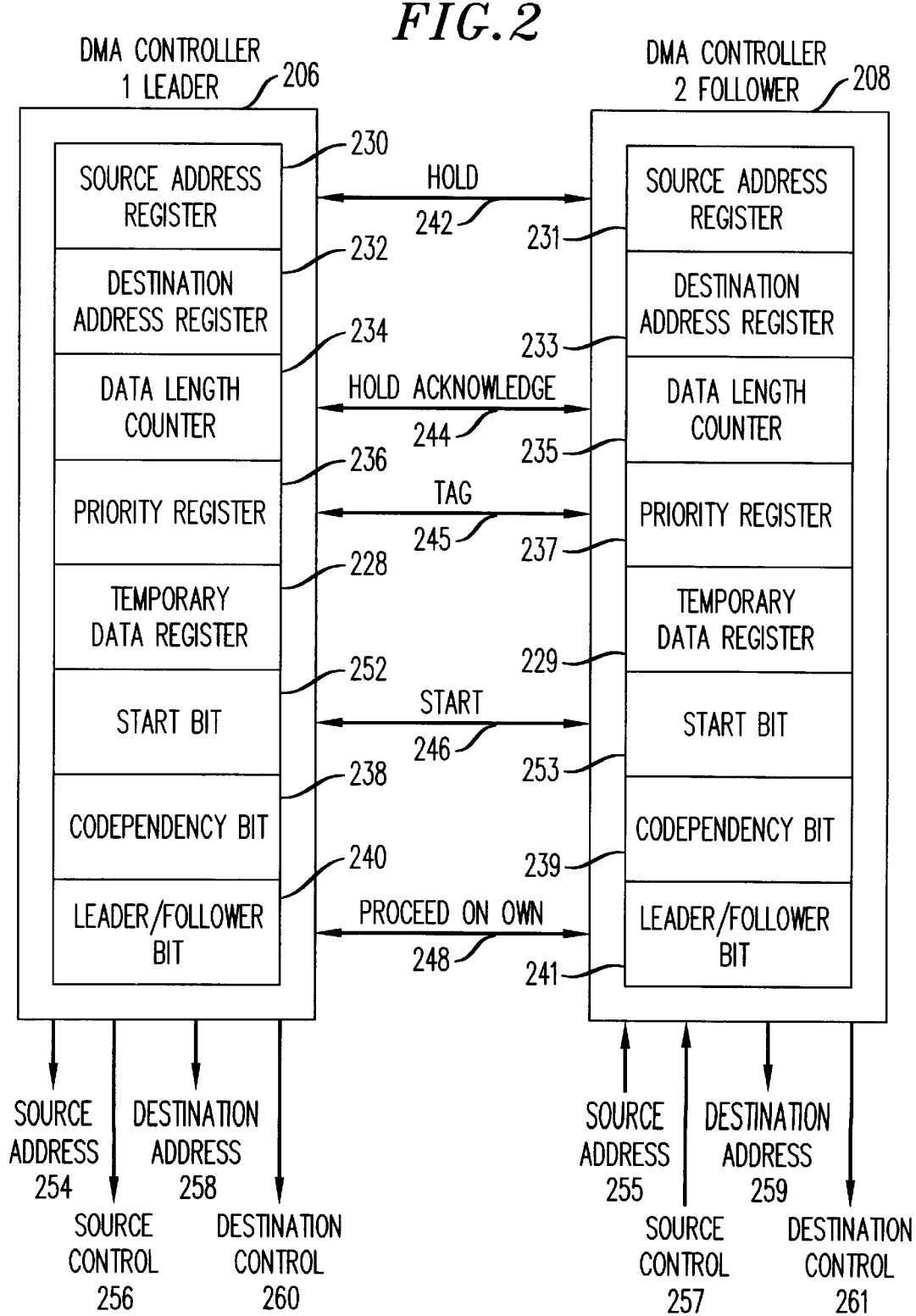
FIG. 2 depicts a DMA controller register and signaling architecture for the illustrative embodiment of FIG. 1.

For consistency and ease of understanding, those elements of each figure that are similar or equivalent share identification numbers that are identical in the two least significant digit positions (for example, the DMA Controller 106 of FIG. 1 is equivalent to the DMA Controller 206 of FIG. 2).

DETAILED DESCRIPTION

Consistent with the principles of the present invention, a microcomputer 100 is shown in FIG. 1. Microcomputer 100 has a number of elements including a microprocessor 102, a memory 104, a first DMA controller 106 and a second DMA controller 108. Microprocessor 102 controls the memory 104, the first DMA controller 106, and the second DMA controller 108 by issuing instructions over a global control bus 118. These may include, for example, instructing the first DMA controller 106 to retrieve data from the memory 104 so that it can be written to a first peripheral device 110. The microprocessor 102 addresses a specified memory or register location over a global address bus 116, and is able to send and receive data over a global data bus 114 by executing appropriate control signals over a global control bus 118.

The first and second DMA controllers 106, 108 serve the microcomputer 100 by managing the transfer of data between the memory 104 and the first and second peripheral devices 110, 112, respectively. Accordingly, the first DMA controller 106 issues instructions to the first peripheral device 110 over a local control bus 122, and specifies a target register or local storage address in the first peripheral device 110 over a local address bus 120. Data passes between the memory 104 and the first DMA controller 106 to reach the first peripheral device 110 over the global data bus 114. Similarly, the second DMA controller 108 may communicate instructions to the second peripheral device 112 over a local control bus 126, target a specific register or local storage address in the peripheral device 112 over a local address bus 124, and move data over the global data bus 114.

In the microcomputer 100, throughput is substantially improved over prior art systems by employing DMA controllers 106, 108 in a co-dependent fashion when transferring common data to the peripheral devices. Specifically, for each common data block to be transferred, one DMA controller is designated as a "leader," with responsibility for reading a data block from memory, and then writing the data block to each of the target peripheral devices. The other DMA controller is designated as a "follower," with responsibility for monitoring the data being transferred by the leader and controlling its associated peripheral device to enable data transfer when appropriate from the leader to this device. DMA controllers 106, 108 exchange control signals required for co-dependent operation via a DMA communications bus 170.

FIG. 2 provides further detail to describe the co-dependent operation of DMA controllers 106, 108 of FIG. 1. FIG. 2 depicts DMA controllers 206, 208, which incorporate a series of registers 228–241 and communicate with each other via a set of control signals 242–248 delivered over the DMA communications bus 170 of FIG. 1. Source address registers 230, 231 store, for example, addresses associated with the memory 104 of FIG. 1 from which common data will be retrieved for delivery to the peripheral devices 110, 112. Destination address registers 232, 233 store addresses associated with the peripheral devices 110, 112 to which the common data will be written. Data length counters 234, 235 indicate how many data elements remain to be retrieved to complete the transfer of a desired data block.

Other registers are used to provide information about DMA controller modes of operation. Priority registers 236, 237 are used to indicate which of DMA controllers 206, 208 has priority in obtaining system resources. For example, if priority registers 236, 237 indicate that DMA controller 206 has higher priority than DMA controller 208, DMA controller 206 will be entitled to system resources before these resources are made available to DMA controller 208. Of course, if DMA controllers 206, 208 are operating co-dependently, data transfer will occur in tandem for both controllers according to the leader's priority relative to other microcomputer elements.

Co-dependency bit registers 238, 239 are used to indicate whether DMA controllers 206, 208 are operating in a co-dependent mode. When operating in a co-dependent mode, leader/follower bit registers 240, 241 indicate, for example, that the DMA controller 206 is operating as the leader, and that the DMA controller 208 is operating as the follower. When the DMA controller 206 is enabled and ready to begin operating as the leader, it sends a signal to the start bit register 253 of the follower 208.

A set of five control signals is used for communications between the leader 206 and the follower 208 over the DMA communications bus 170 of FIG. 1. A hold signal 242 is supplied by the leader 206 to identify itself as leader to the follower 208, followed a hold acknowledge signal 244 supplied by the follower to acknowledge the leader. The leader 206 then outputs a start signal 246 to the follower 208 to indicate that data transfer is about to begin. If applicable, a "proceed on own" signal 248 may be used by the leader 206 to communicate to the follower 208 that it has completed the necessary data transfer to its associated peripheral device 110 of FIG. 1, allowing the follower 208 to assume the role of leader for transmitting any additional data required by its associated peripheral device 112 of FIG. 1.

In an alternative embodiment of the invention, a tag signal 245 may be used, for example, by the leader 206 to set a tag bit in a temporary data register 229 of the follower 208 to indicate that the data element being placed by the leader 206 on the global data bus 114 of FIG. 1 is intended for the peripheral device 112 of FIG. 1. This feature is helpful when the leader 206 is capable of storing multiple data elements, not all of which are intended to be received by the peripheral device 112.

The leader 206 retrieves data from the memory 104 of FIG. 1 by asserting a source address signal 254 and a source control signal 256 over the global address bus 116 and global control bus 118 of FIG. 1, respectively. The source address signal 254 communicates the contents of the source address register 230 of the leader 206. Once a data element has been retrieved, the leader 206 then transmits this data element over the global data bus 114 of FIG. 1 to the first peripheral device 110 of FIG. 1 by asserting a destination address signal 258 and a destination control signal 260 on the local address bus 120 and the local control bus 122 of FIG. 1, respectively. The destination address signal 258 incorporates the contents of the destination address register 232.

Coincidently, the follower 208 monitors the global address bus 116 of FIG. 1 to receive a source address signal 255 that reflects the source address signal 254 asserted by the leader 206. The follower 208 compares the source address signal 255 with the contents of the source address register 231 to determine whether there is an address match. If there is a match, the follower 208 then prepares the peripheral device 112 of FIG. 1 to receive the data element being sent by the leader 206 over the global data bus 114 of FIG. 1 by asserting a destination address signal 259 over the local address bus 124 of FIG. 1 and a destination control signal 261 over the local control bus 126 of FIG. 1. The destination address signal 259 of FIG. 2 communicates the contents of destination address register 233.

Figure 3:
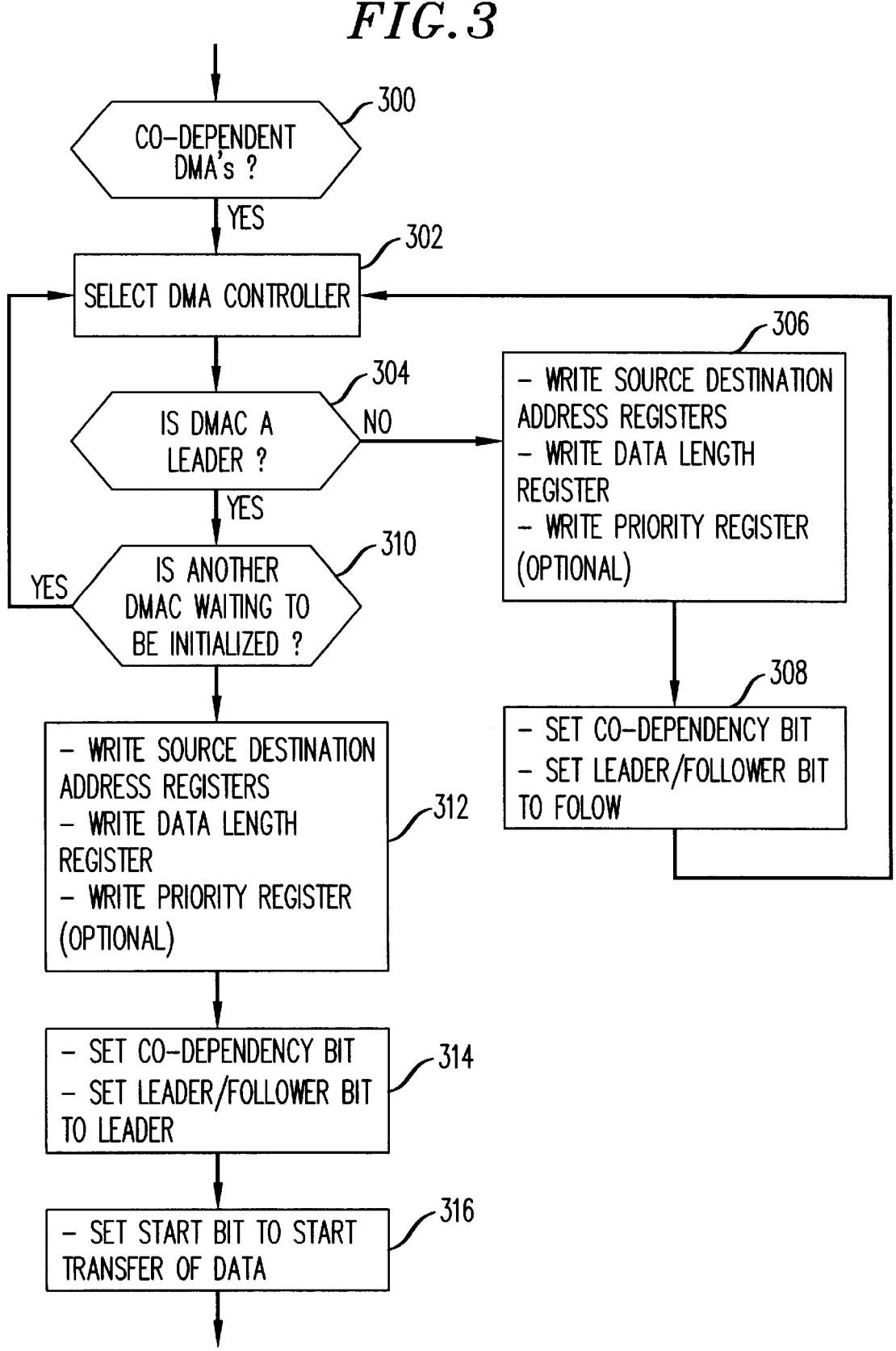
FIG. 3 presents a flow diagram illustrating how the DMA controllers are initialized to begin transferring data co-dependently.

Co-dependent operation begins with the initialization of the DMA controllers 206, 208. FIG. 3 depicts the initialization process. In step 300, microprocessor 102 of FIG. 1 determines that co-dependent DMA operation is required. In step 302, microprocessor 102 selects a DMA controller, and in step 304, determines whether the selected DMA controller will be appointed to be the leader. The DMA controller whose associated peripheral device requires the earliest data transfer is appointed as leader. If the selected controller is the leader and, as determined in step 310, the other controller (or follower) has not been initialized, then the other controller is selected to be initialized. Followers are initialized before the leader to eliminate any possibility that the leader may begin data transfer with a non-initialized follower.

A process for initializing the follower begins with step 306. In step 306, the microprocessor 102 of FIG. 1 writes a starting address associated with the memory 104 to the follower's source and destination address registers 231, 233 of FIG. 2, and writes the number of data elements in the data block to be transferred to its data length counter 235. In step 308 of FIG. 3, the microprocessor 102 of FIG. 1 sets the co-dependency bit 239 of the follower 208 of FIG. 2 to a value indicating co-dependent operation, and sets the leader/follower bit 241 to of the follower 208 to a value indicating follower.

After the follower is initialized, microprocessor 102 of FIG. 1 selects the leader in step 302 of FIG. 3, and after confirming that no additional followers remain to be initialized in step 310, proceeds in steps 312, 314 to initialize the leader in substantially the same manner as the follower was initialized in steps 306, 308. Two differences are noteworthy. In step 314, the leader/follower bit 240 is set to leader rather than follower, and inn step 316, the leader asserts the start signal 246 of FIG. 2 to inform the follower 208 that data retrieval and transfer is about to begin.

Figure 4:
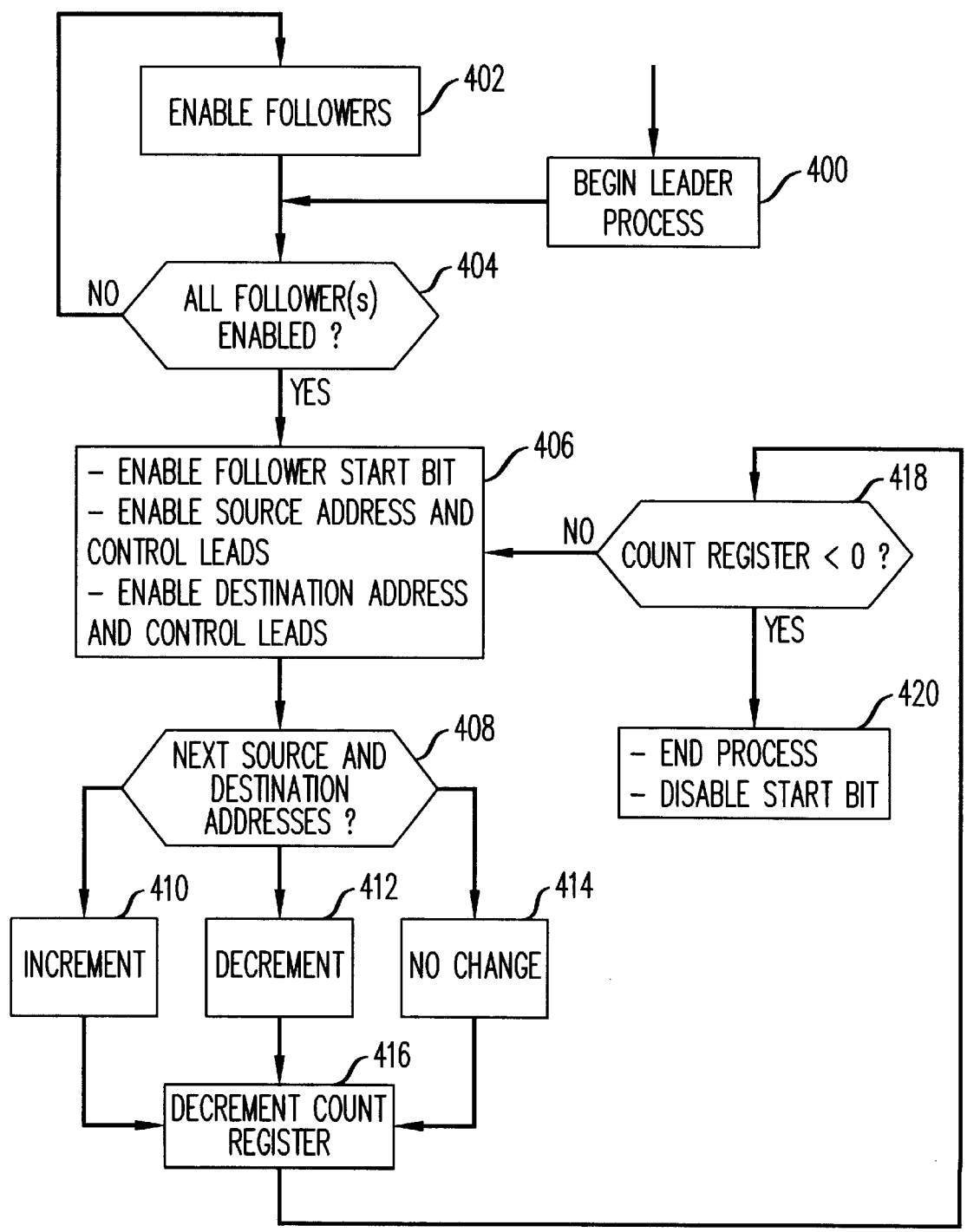
FIG. 4 presents a flow diagram that shows how one DMA controller (the "leader") reads data from a microcomputer memory and writes this data to multiple peripheral units.

The leader's data retrieval and transfer process is depicted in the flow diagram of FIG. 4. After beginning the process in step 400, the microprocessor 102 of FIG. 1 determines whether the initialization process of FIG. 3 has been completed for all followers. If not, in steps 402 and 404 of FIG. 4, the microprocessor 102 executes the initialization process of FIG. 3 until the followers are all enabled. In step 406, the leader 206 of FIG. 2 asserts a start signal 246 that is received by the follower 208 to disable any prior data transfer occurring in the follower. The leader 206 also asserts source address and control signals 254, 256 and destination address and control signals 258, 260 to read a data element from the memory 104 of FIG. 1 at the memory address specified in source address register 230 of FIG. 2, and writes this data element to the first peripheral device 110 over the global data bus 114 to a destination address specified in destination address register 232. As will be further explained in the discussion of the flow diagram of FIG. 5, the data element written by the leader 206 over the global address bus 114 of FIG. 1 is also written to the second peripheral device 112.

In steps 408 through 414 of FIG. 4, based on instruction from the microprocessor 102, the leader 206 of FIG. 2 determines whether the source and destination addresses stored in registers 230, 232 should be decremented, incremented or left unchanged, and updates these registers accordingly. In step 416, the leader 206 decrements the data length counter 234, and in step 418, determines the value of the resulting number stored in the data length counter 234. If the number stored in the data length counter 234 is greater than or equal to zero, the leader 206 returns to step 406 to read and transfer the next data element. Otherwise, in step 420 of FIG. 4, the leader 206 of FIG. 2 ends the data retrieval and transfer process, and unasserts the start signal 246. Once this signal has been unasserted, if required, the follower may assume the role of leader to complete any additional data retrieval and transfer to the second peripheral device 112 of FIG. 1.

Figure 5:
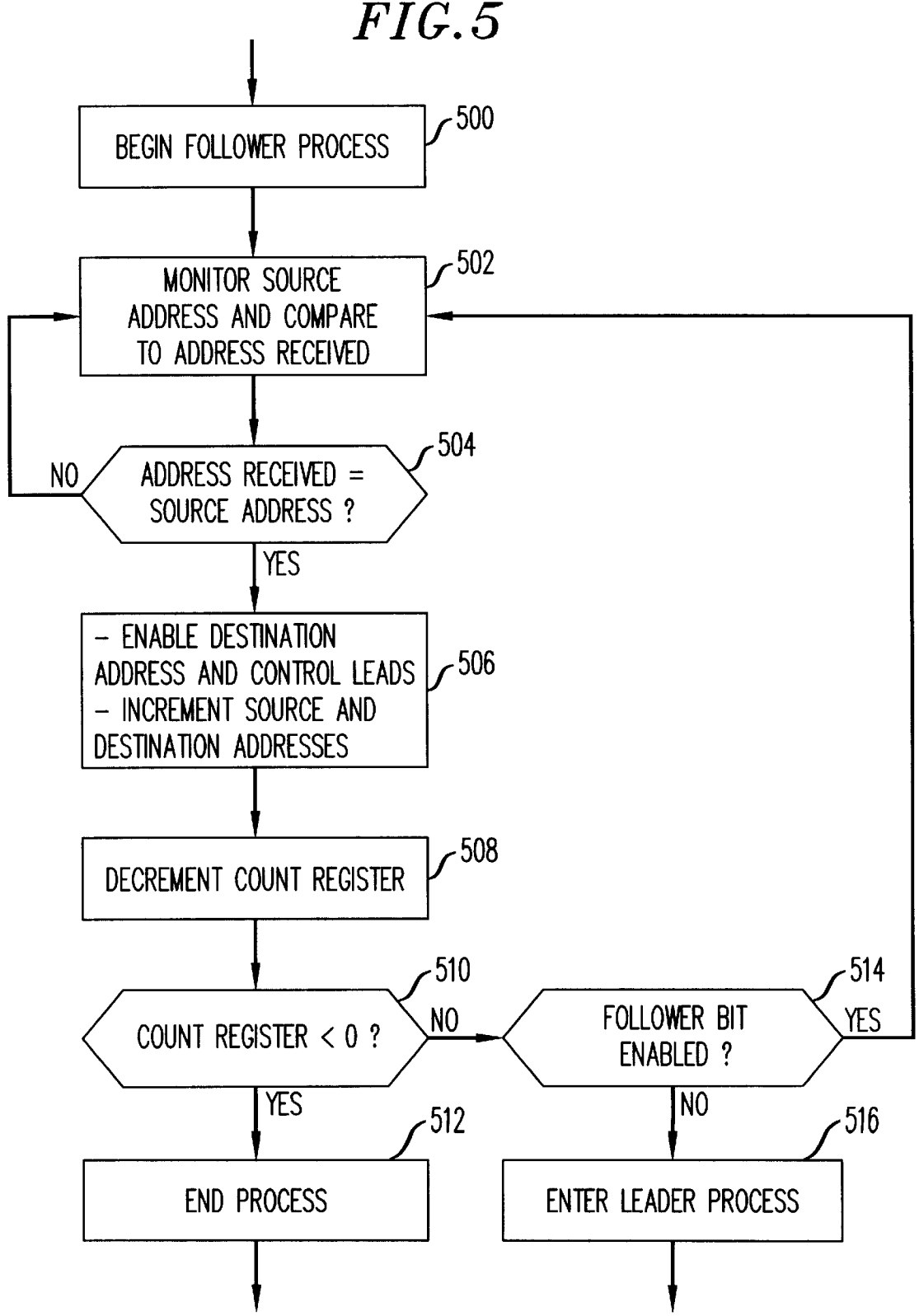
FIG. 5 presents a flow diagram that shows how another DMA controller (the "follower") causes the receipt of data written by the leader at an associated peripheral device.

The follower's data transfer process is depicted in the flow diagram of FIG. 5. After beginning the process in step 500, the follower 208 of FIG. 2 monitors the source address signal 255 of FIG. 2 asserted by the leader 208 in step 502 of FIG. 5 to determine in step 504 whether asserted address matches the source address written to the follower's source address register 231. If these addresses match, the follower 208 proceeds in step 506 of FIG. 5 to assert the destination address and control signals 259, 261 so that data may be written by the leader 206 to the second peripheral device 112 of FIG. 1.

After the data is written to the second peripheral device 112, in step 506 of FIG. 5, in a manner substantially similar to steps 408–418 of FIG. 4, the follower 208 of FIG. 2 increments, decrements or preserves each of the addresses in the source and destination address registers 231, 233 of FIG. 2 Then, in step 508, the follower 208 decrements the data length counter 235.

In step 510, the leader determines the value of the number in the data length counter 235. If the number stored in the data length counter 235 is less than zero, the follower ends the data transfer process in step 512. Otherwise, in step 514 of FIG. 5, the follower determines whether its follower start bit is enabled. If enabled, the follower 208 returns to step 502 to continue the follower process. Otherwise, in step 516, the follower 208 ends the follower process, and enters the leader process as the leader to complete any additional data retrieval and transfer.

Figure 6:
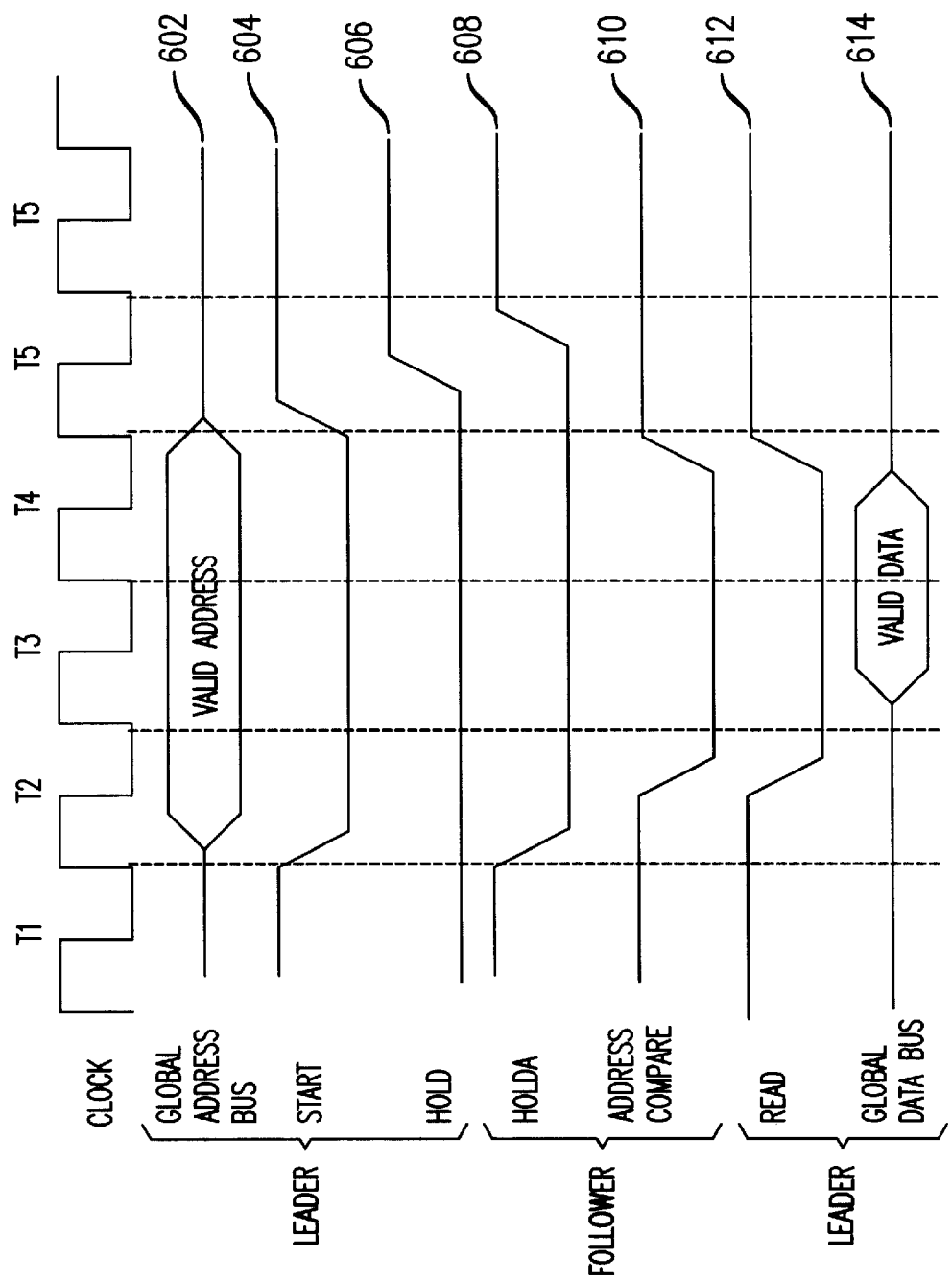
FIG. 6 shows a timing diagram that illustrates the signaling required by the DMA controllers to read data from the microcomputer memory.

FIGS. 6 through 10 present timing diagrams that illustrate the co-dependent operation of DMA controllers 206, 208 in further detail. In each figure, a clock trace is provided as a point of reference for the other illustrated signal traces. However, an actual signal representing this clock trace is not required to be part of the present invention. In each of the FIGS. 6 through 10, a signal is asserted when the trace line reaches a minimum ("assert low"). For the purposes of the following discussion, each signal trace line is denoted by a reference numeral FIG. 6 illustrates the signaling performed by the leader 206 and the follower 208 of FIG. 2 in order to begin co-dependent operation. In FIG. 6, during timer interval T1, the leader 206 of FIG. 2 asserts a hold signal 606. During subsequent time interval T2, the follower 208 acknowledges by asserting a hold acknowledge ("HOLDA") signal 608, and the leader 206 signals that co-dependent operation is about to begin by asserting a start signal 604 and placing the source address signal 602 on the global address bus 116 of FIG. 1. With the assertion of the start signal 604, the follower 208 of FIG. 2 reads the source address signal 602 from the global address bus 116 of FIG. 1, and asserts an address compare signal 610 to compare the address contained in the source address signal 602 with the address stored in the source address register 231 of FIG. 2.

As also illustrated by FIG. 6, the leader 206 of FIG. 2 asserts a read signal 612, and during subsequent time interval T3, begins to read an initial data element signal 614 from the global data bus 114 of FIG. 1. During subsequent time interval T4, the leader 206 completes reading the data element signal 614 and unasserts the read signal 612. In addition, the follower 208 completes its address comparison and unasserts its address compare signal 610. As a result, during subsequent time interval T5, the leader 206 unasserts its start signal 604 and hold signal 606, causing the follower 208 to unassert its hold acknowledge signal 608.

Figure 7:
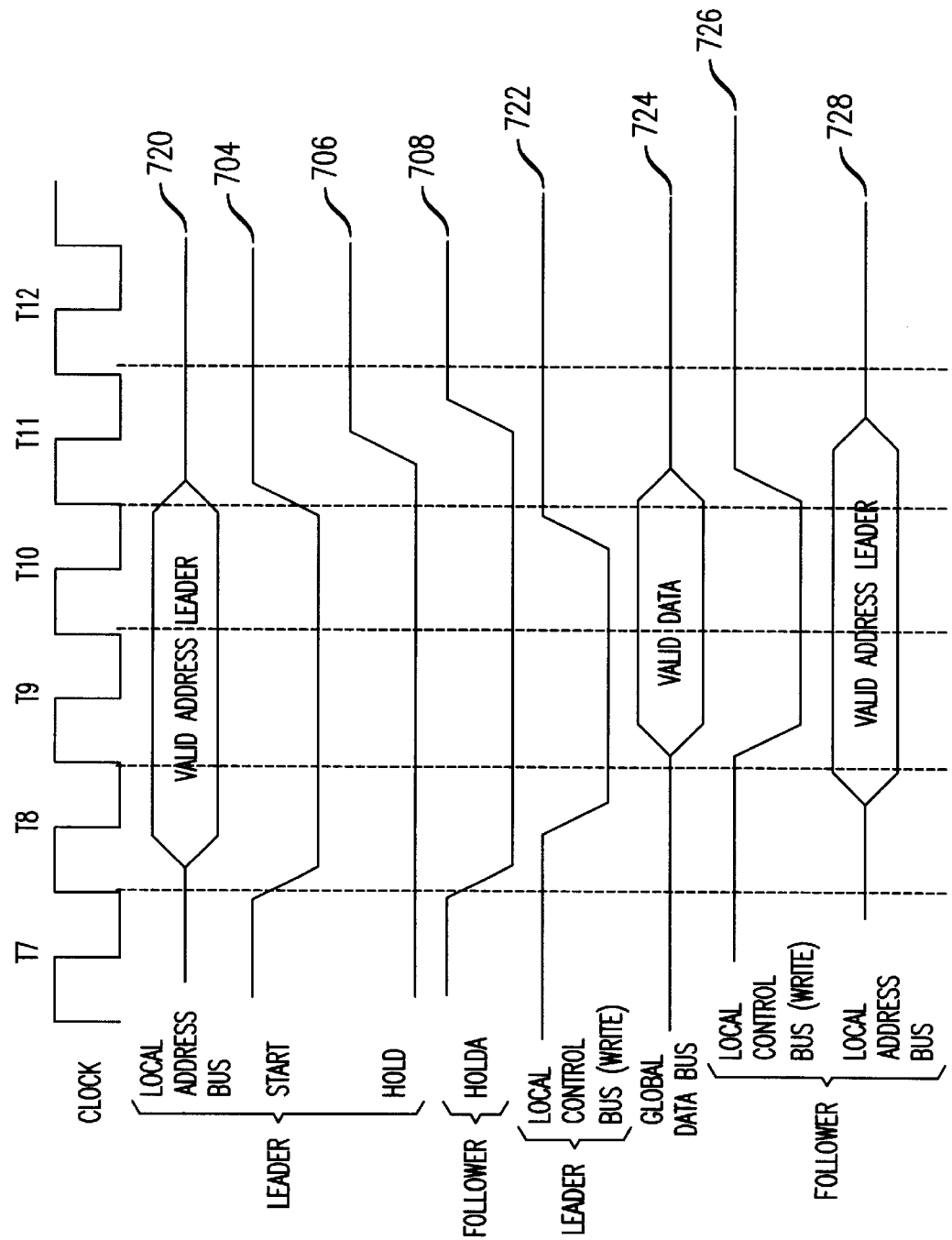
FIG. 7 shows a timing diagram that illustrates the signaling required by the DMA controllers required to write data to the peripheral devices.

FIG. 7 illustrates, after the leader 206 has read the data element to be transferred, the signaling performed by the leader 206 and the follower 208 in order to write the data element to the peripheral devices 110, 112 of FIG. 1. During interval T7, the leader 206 of FIG. 2 asserts a hold signal 706. During subsequent time interval T8, the follower 208 acknowledges this signal by asserting a hold acknowledge signal 708, and the leader 206 signals that co-dependent operation is about to begin by asserting a start signal 704. Coincidently, the leader 206 prepares to transfer the data element by retrieving a destination address from the destination address register 232 of FIG. 2. The leader 206 then asserts a destination address signal 720 on the local address bus 120 of FIG. 1 and a destination control signal 722 ("write") on the local control bus 122 of FIG. 1.

During subsequent time interval T9, the follower 208 prepares to assist in transferring the data element by retrieving a destination address from the destination address register 233 of FIG. 2. The follower then asserts a destination address signal 728 on the local address bus 124 of FIG. 1 and a destination control signal 726 ("write") on the local control bus 126 of FIG. 1. Coincidently, the leader 20 places the data element onto the global data bus 114 of FIG. 1 via a data signal 724 for transfer to the peripheral devices 110, 112 of FIG. 1.

In FIG. 7, during subsequent time interval T10, the leader 206 unasserts the destination address signal 720 and destination control signal 722, and unasserts the start signal 704 as well. During subsequent time interval T11, the follower unasserts the destination address signal 728 and destination control signal 726. During the same interval, the operation is completed when the leader 206 unasserts the hold signal 706 and the follower unasserts the HOLDA signal 708.

Figure 8:
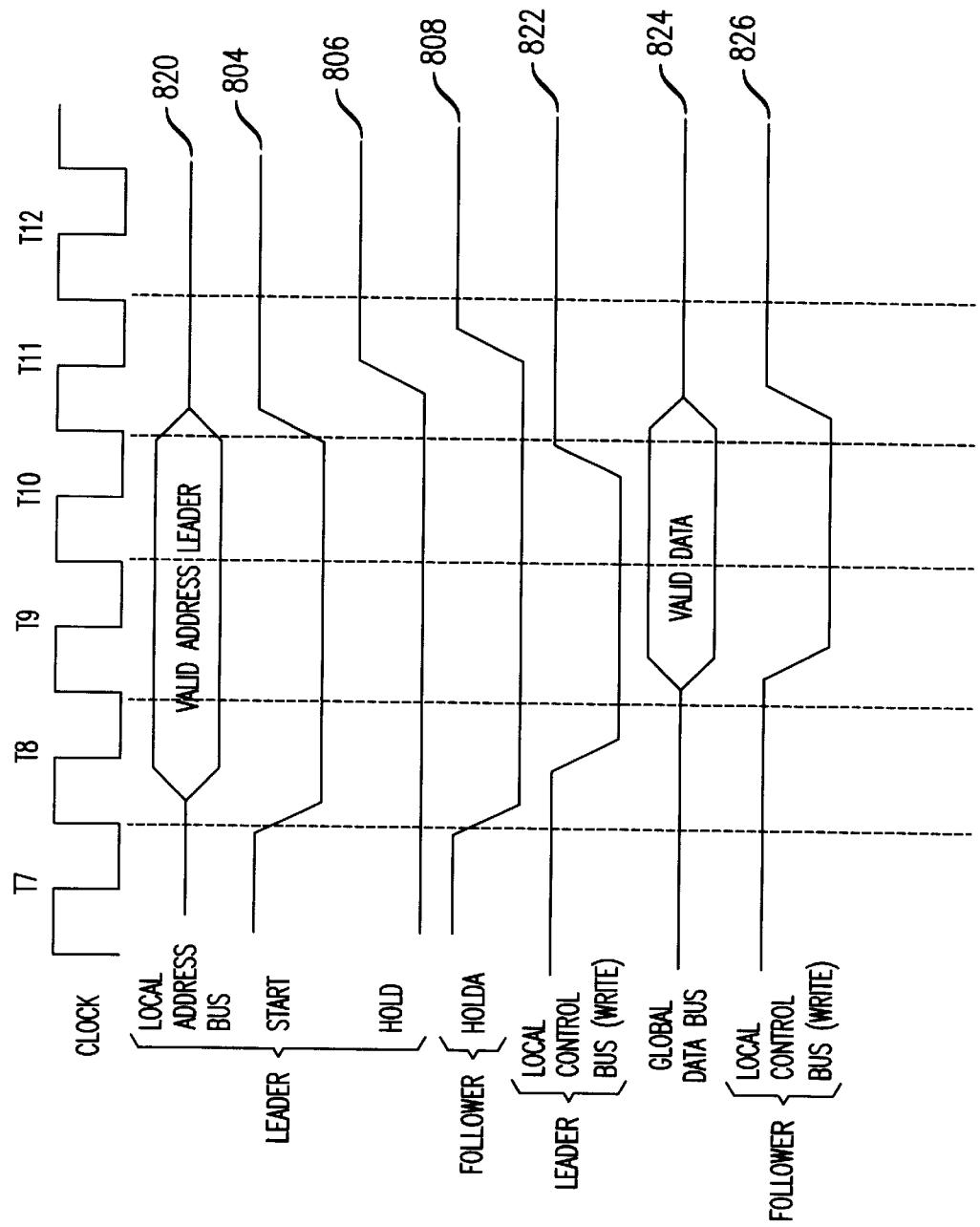
FIG. 8 provides an alternative to the timing diagram of FIG. 7, applicable in an alternative embodiment of the invention, in which data is written to a first-in-first-out queue ("FIFO") in the peripheral device associated with follower rather than to an addressable location in that peripheral device.

FIG. 8 presents a timing diagram for an alternative embodiment of the present invention as illustrated in FIG. 7, in which the peripheral device 112 of FIG. 1 associated with the follower 208 of FIG. 2 receives data in a FIFO register rather than in a separately addressed storage location. In time interval T9, in order to assist in a data transfer to the peripheral device 112, the follower simply asserts a destination control signal 826 over the local control bus 126 of FIG. 1. Unlike the embodiment illustrated in FIG. 7, no destination address signal need be provided to the peripheral device 112.

Figure 9:
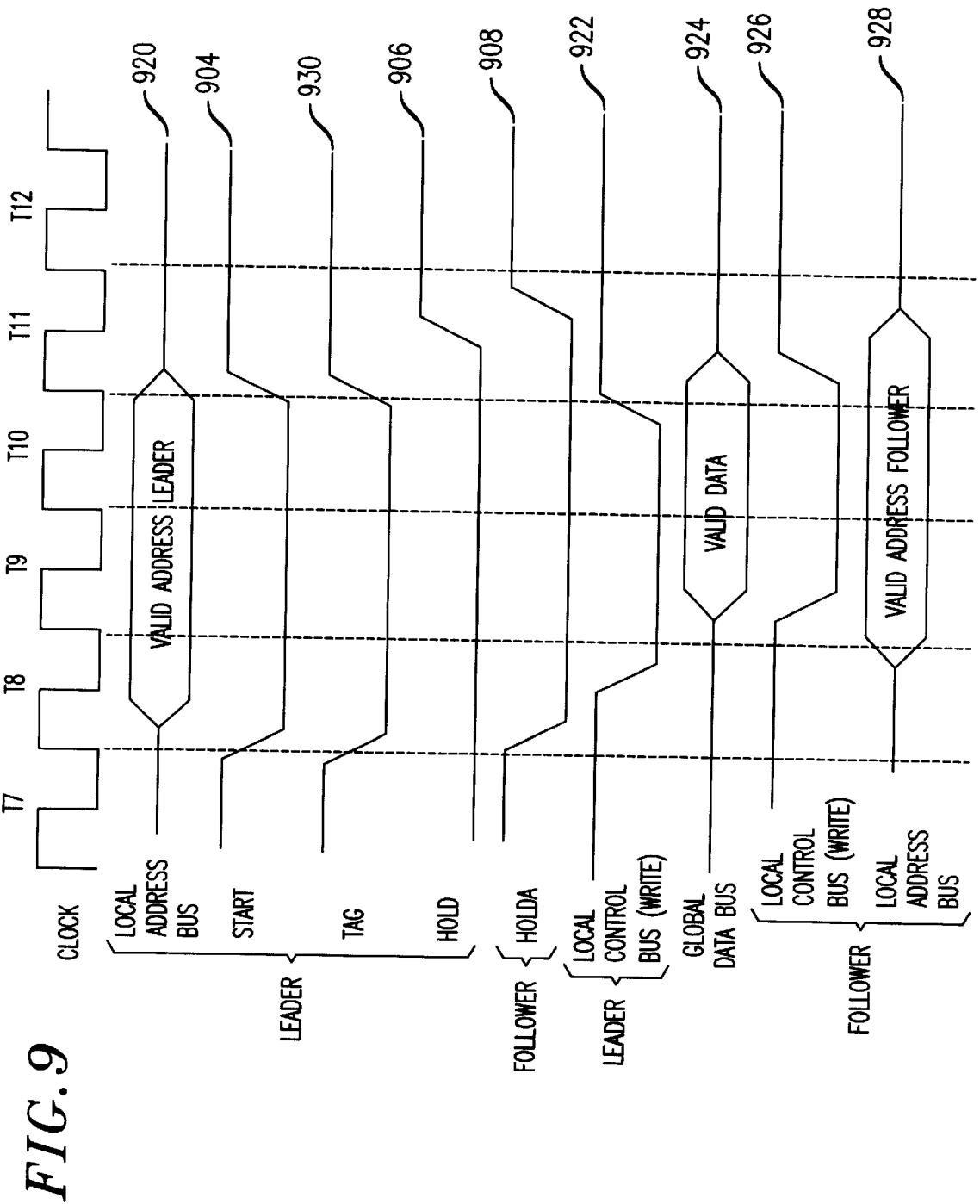

FIG. 9 presents a timing diagram for a second alternative embodiment of the present invention as illustrated in FIG. 7, in which the leader 206 of FIG. 2 is capable of reading and storing multiple data elements (for example, in a FIFO) before writing any data. As the leader 206 prepares to write the first data element intended for the peripheral device 112 of FIG. 1, during time interval T8, a tag signal 930 is asserted in addition to the start signal 904 by the leader 206 of FIG. 2 over the DMA communications bus 170 of FIG. 1. As a result, a tag bit is set in a temporary data register 229 in the follower 208, which informs the follower 208 that the leader 206 is preparing to write a data element intended for the peripheral device 112.

Accordingly, in FIG. 9, the follower 208 responds in a manner substantially similar to the follower response illustrated in FIG. 7, in which the follower first asserts a hold acknowledge signal 908. Subsequently during time interval T9, the follower 208 asserts a destination address signal 928 over the local address bus 124 and a destination control signal ("write") 926 over the local control bus 126 of FIG. 1. After the first data element has been written by the leader 206 to the peripheral device 112 over the global address bus 114, the follower 208 unasserts the destination address signal 928 and the destination control signal 926 during subsequent interval T11. During the same time interval, in completion of the data transfer process, the leader 206 unasserts the start signal 904, the tag signal 930 and the hold signal 906, and the follower unasserts the hold acknowledge signal 908.

After a first data element is transferred using the signaling scheme indicated in FIG. 9, subsequent data elements are transferred employing the signaling scheme shown in the timing diagram of FIG. 10. The timing diagram of FIG. 10 is substantially similar to the timing diagram of FIG. 9 with the exception of the tag signal 1030. Once the first data element is transferred according to the scheme of FIG. 9, the tag signal is no longer required. The follower 208 of FIG. 2 continues to transfer each data element subsequently written by the leader 206 ver the global data bus 114 until its data length counter 235 has been decremented to complete the data transfer per the process of FIG. 5.

The exemplary embodiment described above is but one of a number of alternative embodiments of the invention that will be apparent to those skilled in the art in view of the foregoing description. Accordingly, this description is to be construed as illustrative only, and is for the purpose of teaching those skilled in the art the best mode of carrying out the invention. Various other alternatives can be devised by a worker skilled in the art without departing from the teachings of this invention. For example, the microcomputer 100 of FIG. 1 could be equipped with three or more DMA controllers configured and interconnected in a manner similar to that portrayed for the DMA controllers 206, 208 of FIG. 2. Additionally, the DMA controller 206, 208 and the peripheral devices 110, 112 of FIG. 1 could be variously equipped either with FIFOs or directly addressable memory space. Further, the DMA controllers 206, 208 could be adapted to transfer data elements of a variety of organizations and lengths to the peripheral devices 110, 112.

I claim:

1. A microcomputer system, for transferring a data block from a memory to a first and second peripheral device, the system comprising:

processing unit initializing first and second DMA controllers for co-dependent operation;

said first DMA controller and said second DMA controller coordinating operations by communicating over a DMA communications bus;

said first DMA controller reading the data element over a global data bus from an address in the memory and providing control signals to the first peripheral device over a first local control bus; and said first DMA controller writing the data element in a single write cycle over the global data bus to the first peripheral device and the second peripheral device wherein said first and second DMA controllers communicate over the DMA commnunications bus via control signals, said control signals including:

a hold signal by which said first DMA controller requests permission to write the data element;

a hold-acknowledge signal by which said second DMA controller grants said first DMA controller said permission; and a start signal for said first DMA controller to signal the start of data transfer wherein said first DMA controller also provides address signals to the first peripheral device over a first local address bus, and said second DMA controller provides address signals to said second peripheral device over a second local address bus.

2. A microcomputer system, for transferring a data block from a memory to a first and second peripheral device, the system comprising;

a processing unit initializing first and second DMA controllers for co-dependent operation;

said first DMA controller and said second DMA controller coordinating operations by communicating over a DMA communications bus;

said first DMA controller reading the data element over a global data bus from an address in the memory and providing control signals to the first peripheral device over a first local control bus;

said second DMA controller providing control signals to the second peripheral device over a second local control bus; and said first DMA controller writing the data element in a single write cycle over the global data bus to the first peripheral device and the second peripheral device wherein said first and second DMA controllers communicate over the DMA communications bus via control signals, said control signals including:
 a hold signal by which said first DMA controller requests permission to write the data element;
 a hold-acknowledge signal by which said second DMA controller grants said first DMA controller said permission; and
 a start signal for said first DMA controller to signal the start of data transfer.

3. A microcomputer system, for transferring an element of a data block from a memory to first and second peripheral devices, the system comprising:

a processing unit initializing first and second DMA controllers for codependent operation, said first DMA controller and said second DMA controller coordinating operations by communicating over a DMA communications bus, said first DMA controller reading the data element over a global data bus from an address in the memory and providing control signals to the first peripheral device over a first local control bus, said first DMA controller capable of reading multiple data elements and writing the data element in a single write cycle over the global data bus to the first peripheral device and to the second peripheral device, and said second DMA controller providing control signals to the second peripheral device over a second local control bus;

wherein said first and second DMA controllers communicating over the DMA communications bus via control signals, said control signals including:
 a hold signal by which said first DMA controller requests permission to write the data element;
 a hold-acknowledge signal by which said second DMA controller grants said first DMA controller said permission;
 a start signal for said first DMA controller to signal the start of data transfer; and
 a proceed-on-own signal by which said first DMA controller transfers control to said second DMA controller to read a subsequent data element in the data block from the memory and write said subsequent data element to the second peripheral device.

4. A microcomputer system, for transferring an element of a data block from a memory to first and second peripheral devices, the system comprising:

a processing unit initializing first and second DMA controllers for codependent operation, said first DMA controller and said second DMA controller coordinating operations by communicating over a DMA communications bus;

said first DMA controller reading the data element over a global data bus from an address in the memory and providing control signals to the first peripheral device over a first local control bus and said first DMA controller capable of reading multiple data elements, said second DMA controller providing control signals to the second peripheral device over a second local control bus, and said first DMA controller writing the data element in a single write cycle over the global data bus to the first peripheral device and to the second peripheral device;

wherein said first and second DMA controllers communicate over the DMA communications bus via control signals, said control signals including:
 a hold signal by which said first DMA controller requests permission to write the data element;
 a hold-acknowledge signal by which said second DMA controller grants said first DMA controller said permission;
 a start signal for said first DMA controller to signal the start of data transfer; and
 a tag signal of said first DMA controller to signal to said second DMA controller the start of data transfer for the first data element to be transferred to the second peripheral device.

5. A microcomputer system, for transferring an element of a data block from a memory to first and second peripheral devices, the system comprising:

a processing unit initializing first and second DMA controllers for codependent operation, said first DMA controller and said second DMA controller coordinating operations by communicating over a DMA communications bus, said first and second DMA controllers each including a source address register for storing a memory address for a current data element to be retrieved and a temporary data register to hold a tag bit to indicate that said first DMA controller has begun to transfer a first data element in the data block to the second peripheral device, said first DMA controller reading the data element over a global data bus from an address in the memory and providing control signals to the first peripheral device over a first local control bus, and said second DMA controller providing control signals to the second peripheral device over a second local control bus and said first DMA contoller writing the data element in a single write cycle over the global data bus to the first peripheral device and to the second peripheral device;

a destination address register for storing a peripheral device address associated where the current data element will be written;

a data length counter for storing a number representing the number of data elements to be transferred in the data block;

a codependency bit register to indicate whether said DMA controller will operate co-dependently;

a leader/follower bit register to indicate, when said first and second DMA controllers are operating co-dependently, that said first DMA controller will read and write the data block; and a start bit register to indicate that said first DMA controller is ready to transfer the current data element.

6. A method, in a microcomputer system, for transferring an element of a data block from a memory to first and second peripheral devices, said method comprising the steps of:

selecting a first DMA controller to act as a data transfer leader and a second DMA controller to act as a data transfer follower;

initializing said follower and said leader;

reading of the data element from the memory by said leader;

applying control signals to the first peripheral device by said leader; applying control signals to the second peripheral device by said follower;

writing the data element to the first peripheral device and to the second peripheral device by said leader;

synchronizing the follower and the leader after initializing the follower and the leader, said synchronizing step including the steps of:

signaling by said leader to said follower to request the start of co-dependent operation;

signaling by said follower to said leader to acknowledge the leader's request, and signaling by the leader to the follower, after receiving the acknowledgment, that transfer of the data element is about to begin.

7. A method, in a microcomputer system, for transferring an element of a data block from a memory to first and second peripheral devices, said method comprising the steps of:

selecting a first DMA controller to act as a data transfer leader and a second DMA controller to act as a data transfer follower;

initializing said follower and said leader;

reading of the data element from the memory by said leader;

applying control signals to the first peripheral device by said leader;

applying control signals to the second peripheral device by said follower; and writing the data element to the first peripheral device and to the second peripheral device by said leader.

wherein said first DMA controller also provides address signals to the first peripheral device and said second DMA controller also provides address signals to said second peripheral device, and wherein said initializing step includes:

writing a source address to source address registers in said follower and in said leader, the source address indicating a memory location from which the data element will be transferred;

writing a destination address to a destination address register in said follower, the destination address indicating a storage location in the second peripheral device that will receive the transferred data element;

writing another destination address to a destination address register in said leader, the other destination address indicating a storage location in the first peripheral device that will receive the transferred data element;

determining a number of data elements in a data block to be transferred from the memory to said peripheral devices, and writing said number to data length counters in said follower and in said leader;

setting a co-dependency bit in said follower and in said leader to indicate that each will operate co-dependently;

setting a leader-follower bit in said follower to identify it as the follower;

setting a leader-follower bit in said leader to identify it as the leader; and setting a start bit in said follower to signal that said leader will transfer the data element.

8. A method, in a microcomputer system, for transferring an element of a data block from a memory to first and second peripheral devices, said method comprising the steps of:

selecting a first DMA controller to act as a data transfer leader and a second DMA controller to act as a data transfer follower;

initializing said follower and said leader;

reading of the data element from the memory by said leader;

applying control signals to the first peripheral device by said leader;

applying control signal to the second peripheral device by said follower; and writing the data element to the first peripheral device and to the second peripheral device by said leader updating the source address registers to indicate an address in the memory from which a next data element will be retrieved;

updating the destination address register in said follower to indicate an address in the second peripheral device for transferring the next data element;

updating the destination address register in said leader to indicate an address in the first peripheral device for transferring the next data element;

decrementing the numbers in the data length counters in said leader and in said follower;

determining whether the data length counter numbers are greater than zero; and if the numbers are greater than zero;

reading and storing the next data element in said leader;

addressing the first peripheral device via said leader;

addressing the second peripheral devices via said follower; and writing the next data element from said leader to the first peripheral device and then to the second peripheral device;

wherein said first DMA controller also provides address signals to the first peripheral device and said second DMA controller also provides address signals to said second peripheral device and wherein said initializing step includes:

writing a source address to source address registers in said follower and in said leader, the source address indicating a memory location from which the data element will be transferred;

writing a destination address to a destination address register in said follower, the destination address indicating a storage location in the second peripheral device that will receive the transferred data element;

writing another destination address to a destination address register in said leader, the other destination address indicating a storage location in the first peripheral device that will receive the transferred data element;

determining a number of data elements in a data block to be transferred from the memory to said peripheral devices, and writing said number to data length counters in said follower and in said leader;

setting a co-dependency bit in said follower and in said leader to indicate that each will operate co-dependently;

setting a leader-follower bit in said follower to identify it as the follower;

setting a leader-follower bit in said leader to identify it as the leader; and setting a start bit in said follower to signal that said leader will transfer the data element.

9. A method, in a microcomputer system, for transferring an element of a data block from a memory to first and second peripheral devices, said method comprising the steps of:

selecting a first DMA controller to act as a data transfer leader and a second DMA controller to act as a data transfer follower;

initializing said follower and said leader;

reading of the data element from the memory by said leader;

applying control signals to the first peripheral device by said leader;

applying control signals to the second peripheral device by said follower; and writing the data element to the first peripheral device and to the second peripheral device by said leader updating the source address registers to indicate an address in the memory from which a next data element will be retrieved;

updating the destination address register in said follower to indicate an address in the second peripheral device for transfer the next data element;

updating the destination address register in said leader to indicate an address in the first peripheral device for transferring next data element;

decrementing the numbers in the data length counters in said leader and in said follower;

determining whether the data length counter numbers are greater than zero; and if the numbers are greater than zero, reading and storing the next data element in said leader;

addressing the first peripheral device via said leader;

addressing the second peripheral devices via said follower; and writing the next data element from said leader to the first peripheral device and then to the second peripheral device;

wherein said first DMA controller also provides address signals to the first peripheral device and said second DMA controller also provides address signals to said second peripheral device and wherein said initializing step includes:

writing a source address to source address registers in said follower and in said leader, the source address indicating a memory location from which the data element will be transferred;

writing a destination address to a destination address register in said follower, the destination address indicating a storage location in the second peripheral device that will receive the transferred data element;

writing another destination address to a destination address register in said leader, the other destination address indicating a storage location in the first peripheral device that will receive the transferred data element;

determining a number of data elements in a data block to be transferred from the memory to said peripheral devices, and writing said number to data length counters in said follower and in said leader;

setting a co-dependency bit in said follower and in said leader to indicate that each will operate co-dependently;

setting a leader-follower bit in said follower to identity it as the follower;

setting a leader-follower bit in said leader to identity it as the leader; and setting a start bit in said follower to signal that said leader will transfer the data element;

wherein if the number in the data length counter in said leader is less than or equal to zero, said method further comprising the steps of:

disabling the start bit in said follower;

setting the leader-follower bit in said follower to identify it as a next leader;

updating the source address register in said next leader to indicate an address in the memory from which a next data element will be retrieved, updating said destination address register in said next leader to indicate an address in the second peripheral device for transferring said next data element;

decrementing said number in the data length counter in said next leader;

determining whether said number is greater than zero; and if said number is greater than zero, reading and storing the next data element in said next leader;

addressing the second peripheral device via said leader; and writing the next data element from said next leader to the second peripheral device.

* * * * *